(12) United States Patent
Chua et al.

(10) Patent No.: US 8,732,204 B2
(45) Date of Patent: May 20, 2014

(54) AUTOMATIC FREQUENTLY ASKED QUESTION COMPILATION FROM COMMUNITY-BASED QUESTION ANSWERING ARCHIVE

(75) Inventors: Tat Seng Chua, Singapore (SG); Zhao Yan Ming, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 13/639,229

(22) PCT Filed: Apr. 6, 2011

(86) PCT No.: PCT/SG2011/000139
§ 371 (c)(1),
(2), (4) Date: Oct. 4, 2012

(87) PCT Pub. No.: WO2011/126458
PCT Pub. Date: Oct. 13, 2011

(65) Prior Publication Data
US 2013/0024457 A1  Jan. 24, 2013

Related U.S. Application Data

(60) Provisional application No. 61/321,133, filed on Apr. 6, 2010.

(51) Int. Cl.
*G06F 17/30* (2006.01)
(52) U.S. Cl.
CPC ....................................... *G06F 17/30* (2013.01)
USPC ............ 707/791; 707/802; 707/822; 707/828

(58) Field of Classification Search
CPC ....................................................... G06F 17/30
USPC .................................................. 707/600–899
See application file for complete search history.

(56) References Cited

U.S. PATENT DOCUMENTS

2004/0254917 A1* 12/2004 Brill et al. .......................... 707/3
2007/0083589 A1   4/2007 Olsen

OTHER PUBLICATIONS

Agichtein, E., et al., "Finding High-Quality Content in Social Media," *Proceedings of the International Conference on Web Search and Web Data Mining*, ACM, 2008, pp. 183-194, Palo Alto, California, USA.
Baeza-Yates, R., "User Generated Content: How Good Is It?," *Proceedings of the 3rd Workshop on Information Credibility on the Web*, ACM, 2009, pp. 1-2, Madrid, Spain.
Davitz, R. et al., "iLink Search and Routing in Social Networks," *Proceedings of the Knowledge Discovery and Data Mining (KDD) Conference*, Aug. 12-15, 2007, ten pages, San Jose, California, USA.

(Continued)

*Primary Examiner* — Isaac M Woo
(74) *Attorney, Agent, or Firm* — Fenwick & West LLP

(57) ABSTRACT

Frequently Asked Questions (FAQ) data are generated using Community-based Question Answering (CQA) data. A thematic hierarchy generation module receives multiple data sources and generates a thematic hierarchy of the data source, where a data source has one or more topics and a topic has one or more themes. A feature classifier classifies multiple CQA data into one or more themes based on the thematic hierarchy, where a CQA data contains multiple question-answer pairs. A selection module selects multiple question-answer pairs from the CQA data based on the classification, measures the quality of the selected question-answer pairs and generates FAQ data using the selected question-answer pairs of the CQA data.

17 Claims, 4 Drawing Sheets

(56) References Cited

OTHER PUBLICATIONS

Dumais, S. et al., "Hierarchical Classification of Web Content," *Proceedings of the 23rd Annual International ACM SIGIR Conference on Research and Development in Information Retrieval*, ACM, 2000, pp. 256-263, Athens, Greece.

Guan, H. et al., "A Class-Feature-Centroid Classifier for Text Categorization," *Proceedings of the 18th International Conference on World Wide Web*, ACM, 2009, pp. 201-210, Madrid, Spain.

Han, E. et al., "Centroid-based Document Classification: Analysis and Experimental Results," *Lecture Notes in Computer Science*, Mar. 2000, fifteen pages.

Han, E., et al., "Text Categorization Using Weight Adjusted κ-Nearest Neighbor Classification," *Lecture Notes in Computer Science*, 1999, eleven pages.

Huang, C.-C. et al., "Liveclassifier: Creating Hierarchical Text Classifiers Through Web Corpora," *Proceedings of the 13th International Conference on World Wide Web*, ACM, 2004, pp. 184-192, New York, NY, USA.

Jeon, J., et al., "A Framework to Predict the Quality of Answers with Non-Textual Features," *Proceedings of the 29th Annual International ACM SIGIR Conference on Research and Development in Information Retrieval*, ACM, 2006, pp. 228-235, Seattle, Washington, USA.

Kibriya, A., et al., "Multinomial Naive Bayes for Text Categorization Revisited," *Lecture Notes in Computer Science*, 2005, pp. 488-499.

PCT International Search Report and Written Opinion, PCT Application No. PCT/SG2011/000139, Jun. 15, 2011, ten pages.

Ye, S. et al., "Learning Object Models from Semistructured Web Documents," *IEEE Transactions on Knowledge and Data Engineering*, Mar. 2006, pp. 334-349, vol. 18, No. 3.

\* cited by examiner

US 8,732,204 B2

AUTOMATIC FREQUENTLY ASKED QUESTION COMPILATION FROM COMMUNITY-BASED QUESTION ANSWERING ARCHIVE

CROSS REFERENCE TO RELATED APPLICATIONS

This application claims the benefit of U.S. Provisional Application No. 61/321,133, filed Apr. 6, 2010, entitled "Automatic Frequently Asked Question Compilation from Community-based Question Answering Achieve," which is incorporated by reference in its entirety.

BACKGROUND

This invention generally relates to generation of a Frequently Asked Question (FAQ) list of data from community generated question-answer pairs, or other unstructured archived data.

Community-based Question Answering (CQA) and Frequently Asked Question (FAQ) data are similar in that both provide information using pairs of questions and answers. However, while services providing CQA data accumulate user-generated question-answer pairs, FAQ data is often manually compiled by experts about one or more topics at significant cost. Hence, FAQ data is usually concise, comprehensive, well-partitioned and written in formal and grammatical language while CQA data has varying quality in both language and content and is usually loosely structured and coarsely partitioned because of the large number of participants supplying data.

Maintenance of FAQ data introduces additional complexity by requiring one or more experts in the field of the FAQ data to monitor developments in the FAQ topic and the changes in the behavior of the users of the FAQ topic. Hence, conventional FAQ data is generally under-maintained and quickly becomes outdated. While CQA data is more able to be maintained, the large number of question and answer pairs present in even the most specific level of CQA data results in information overload. Additionally the quality of the content used to generate CQA data varies drastically from excellent to irrelevant. Further, the conventional category structure of CQA data is generally not specific enough to include specific relations for convenient user access.

SUMMARY

Embodiments of the invention relate to a method and a system for hierarchically classifying and summarizing Community-based Question Answering (CQA) data associated with a topic to present concise and hierarchically structured Frequently Asked Question (FAQ) data associated with the topic. In one embodiment, a thematic hierarchy is generated for a specific topic by retrieving data from one or more sources associated with the specific topic and from structured data associated with the specific topic. For example, data associated with the specific topic is retrieved from websites or manuals associated with the specific topic and used to generate a thematic hierarchy associated with the topic.

Using data from the thematic hierarchy, CQA data is retrieved from one or more CQA sources and used to train a classifier. In one embodiment, a classifier, such as Class-Feature-Centroid (CFC) classifier, is trained using data from one or more CQA sources. After being trained, the classifier organizes CQA data into one or more themes from the thematic hierarchy. Question and answer pairs included in CQA data within a theme are clustered and a subset of the question and answer pairs within a cluster of a theme are associated with the theme and stored based on a relevance score and a quality score. Hence, the stored data associated with a theme comprises one or more question and answer pairs having at least a threshold number of features associated with previously-identified high quality question and answer pairs and also having a relatively small distance from a centroid of the cluster including the question and answer pair. The small distance from the centroid of the cluster indicates that a question and answer pair is highly relevant to the theme associated with the cluster.

DETAILED DESCRIPTION

FAQ Generation Platform Architecture

Figure 1:
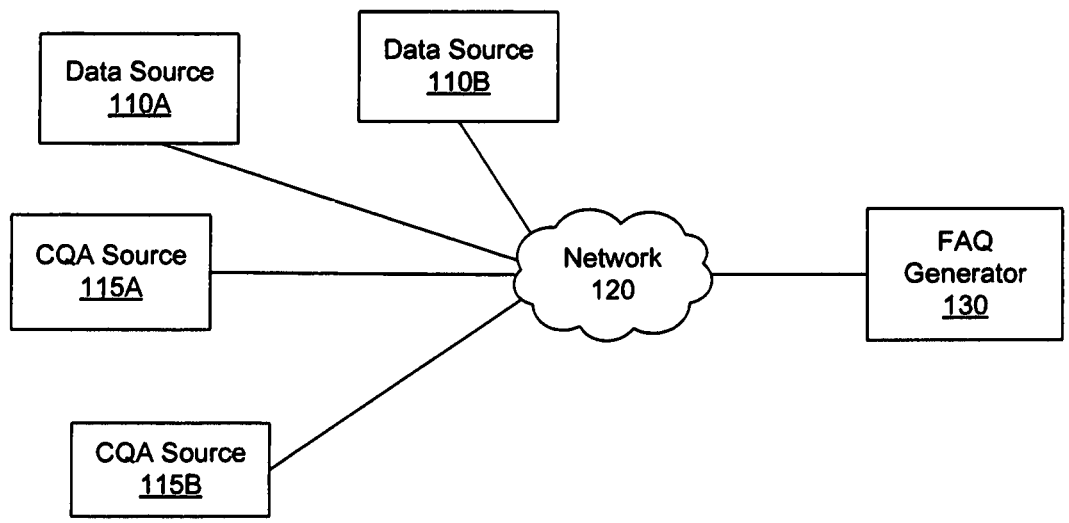
FIG. 1 is a high-level block diagram of a system environment for generation of Frequently Asked Question (FAQ) data using Community-based Question Answering (CQA) data in accordance with an embodiment of the invention.

Embodiments of the invention may be implemented using various architectures, such as the example architecture illustrated in FIG. 1. In this embodiment, a Frequently Asked Question (FAQ) generator 130 retrieves data from one or more data sources 110A, 110B and one or more Community Question Answering (CQA) sources 115A, 115B and generates FAQ data from the retrieved data. In the embodiment shown in FIG. 1, the FAQ generator 130, the data sources 110A, 110B and the CQA sources 115A, 115B are coupled to a network 120. While FIG. 1 depicts two data sources 110A, 110B and two CQA sources 115A, 115B, in other embodiments a greater or fewer number data sources 110 and CQA sources 115 may be used.

The one or more data sources 110A, 110B comprise computing devices or storage devices including data associated with one or more specific topics. As used herein, "topic" refers to a top class or overall name while "theme" refers to categories within a topic. Hierarchically, the topic is the top level of the hierarchy while the "themes" are categories or classes within a topic. For example, a topic may be a product name and themes associated with the topic may be different features of the product. The data sources 110A, 110B include data associated with a topic. Examples of data sources 110A, 110B include product specific web sites, product manuals or other domain specific web pages or web sites. Additionally, data sources 110A, 110B include other information resources, such as online encyclopedias.

The one or more CQA sources 115A, 115B comprise computing devices or storage devices including CQA data associated with one or more specific topics and/or one or more themes within a topic. In one embodiment, CQA data comprises user-generated question-answer pairs structured so that one or more answers are associated with a question. A CQA source 115 may associate stored question-answer pairs with a topic, theme or other category to facilitate subsequent data retrieval.

The network 120, which may comprise any combination of local area and/or wide area networks using wireless communication systems, communicates data between the one or more data sources 110A, 110B, the one or more CQA sources 115A, 115B and/or the FAQ generator 130. In an embodiment, the network 120 is the Internet and uses a combination of wireless and wired communication systems to communicate data.

Figure 3:
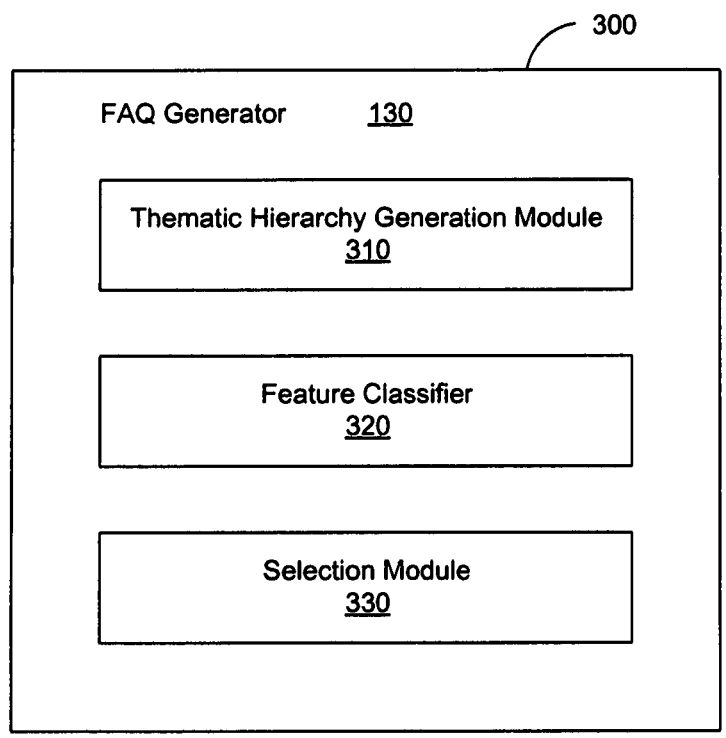
FIG. 3 is a block diagram of a FAQ generator in accordance with an embodiment of the invention.

The FAQ generator 130 comprises one or more computing devices which communicate with the one or more data sources 110A, 110B and/or the one or more CQA sources 115A, 115B via the network 120. In the embodiment illustrated in FIG. 3, the FAQ generator 130 comprises a thematic hierarch generation 310, a feature classifier 320 and a selection module 330. As described above in conjunction with the data sources 110A, 110B, the thematic hierarchy generation module 310 is configured to generate a thematic hierarchy identifying themes within a topic based on the structure or hierarchy of data associated with the topic retrieved from one or more data sources 110A, 110B. The feature classifier 320 is configured to use the thematic hierarchy to generate a class-feature centroid from one or more CQA sources 115A, 115B using a centroid-based classifier. The selection module 330 is configured to select one or more classified CQA data to generate the FAQ data.

The data sources 110A, 110B include data associated with a topic. In one embodiment, the thematic hierarchy generation module 310 uses the structure or hierarchy of data within a data source 110 to generate a thematic hierarchy identifying themes within a topic and the relationship of themes to each other. For example, a hierarchical outline of an online encyclopedia's data about a topic and/or the structure of a topic-specific web site is identified by the FAQ generator 130 and used to generate a structured object model of themes within a topic. The structured object model is further refined into a thematic hierarchy using the structure of online encyclopedia data associated with a topic or the structure of sections of a topic-specific web site.

The feature classifier 320 of the FAQ generator 130 classifies the CQA data based on the thematic hierarchy of topics and themes. In one embodiment, the feature classifier 320 is a modified Class-Feature-Centroid (mCFC) classifier to classify received CQA data using themes from the thematic hierarchy. For example, the mCFC classifier classifies non-leaf themes having at least two child themes, which may be direct child themes or descendents of child themes. The basic framework of mCFC classifier is adopted from a general centroid classifier in which a prototype, or "centroid" is used as a delegate for a theme.

In one embodiment, a new instance, p, is compared with multiple prototypes, and is classified as a theme associated with the most similar prototype. The new instance, p, is compared to each prototype. For example, a vector space model of mCFC in term space is used to represent the prototypes and the instances in the corpus of prototypes, such as the thematic hierarchy. The similarity between a new instance and a prototype is calculated using the cosine similarity between the corresponding term vectors of the new instance and the prototype. Cosine similarity is a measure of similarity between two vectors of n dimensions by finding the cosine of the angle between them (the smaller the angle, the larger the similarity). For example, a new instance is assigned to a theme according to Equation (1) presented below, where T represents a theme and p represents a new instance:

$$\tilde{T} = \mathrm{argmax}_i \left( \frac{\vec{p} \Box \overrightarrow{prototype_i}}{|\vec{p}||\overrightarrow{prototype_i}|} \right) \quad (1)$$

From the thematic hierarchy and a centroid-based classification framework, such as the mCFC classifier described above, the feature classifier 320 categorizes new instances associated with a non-leaf theme to a child theme of the non-leaf theme based on prototype vectors associated with the children theme. In one embodiment, a centroid is represented by a weighted vector $\overrightarrow{prototype_j} = (w_{1j}, w_{2j}, \ldots w_{ij}, \ldots w_{|f|j})$ in the space of the vocabulary f, and the term weight is calculated as the combination of an inner-class term index and an inter-class term index, as:

$$w_{ij} = b^{\frac{DF_{t_i}^j}{|T_j|}} \times \log\left(\frac{|T|}{TF_{t_i}}\right) \quad (2)$$

where $DF_{t_i}^j$ is document frequency of term t, in theme $T_j$, $|T_j|$ is the number of documents in theme $T_j$, $|C|$ is the total number of document classes, $TF_{t_i}$ is the number of themes containing term $t_i$ and b is a constant larger than one.

The first component of Equation (2) is the inner-class term index, which favors frequent terms in questions under a theme. The second component of Equation (2) represents the inter-class term index, which favors discriminative terms that distribute rather differently among themes.

To gather training instances for centroid-based classification, the feature classifier 320 retrieves CQA data from one or more CQA sources 115A, 115B using one or more terms associated with themes from the generated thematic hierarchy. In one embodiment, the feature classifier 320 retrieves data from one or more CQA sources 115A, 115B associated with each theme from the thematic hierarchy. For example the feature classifier 320 issues a query for a theme according to the thematic hierarchy to one or more CQA sources 115A, 115B to collect data for a topic from one or more CQA sources 115A, 115B The feature classifier 320 uses a subset of the data received from the CQA sources 115A, 115B associated with a theme as training data for centroid-based classification for that theme. For example, a specific theme in the thematic hierarchy is constrained by its ancestors and the unification of its descendants, so a query for the specific theme is formed accordingly. In one embodiment, the query associated with the theme is augmented with linked concepts associated with the theme and retrieved from one or more data sources 110A, 110B. For example, a subset of the CQA data, such as the most relevant 20 question and answer pairs, returned by a query are used by the feature classifier 320 to build a training corpus associated with the theme.

In one embodiment, the feature classifier 320 uses a top-down approach for hierarchical classification based on the mCFC output. For example, CQA data associated with a first topic is first categorized into a second level of themes associated with the first topic. CQA data associated with a non-leaf theme are further classified into themes descending from a theme in the second level of themes until the CQA data is associated with a leaf node. In this embodiment, individual models are used for each non-leaf node of a theme by using individual training sets associated with each non-leaf node.

After classifying CQA data into themes from the thematic hierarchy, the selection module 330 of the FAQ generator 130 individually processes CQA data associated with a leaf theme to reduce the amount of CQA data. In one embodiment, the selection module 330 groups CQA associated with a leaf theme into a predefined number of clusters using K-means clustering, or another suitable clustering method, and identifies representative CQA data having a high quality from a plurality of clusters associated with the leaf node. In one embodiment, representative, high-quality CQA data is identified from each cluster associated with a leaf node.

In one embodiment, the selection module 330 selects a set of features used to estimate the quality of different question and answer pairs included in CQA data. Because some features may not be available for each cluster of CQA data or for each question and answer pair within a cluster of CQA data, a subset of the features may also be used to obtain an approximate measure of the quality of a question and answer pair within a cluster of CQA data.

In one embodiment, a labeled training set is generated for CQA quality estimation, where the labeled training set provides the ground-truth for question-answer pairs of a topic or theme. The inter annotator agreement on question and answer pairs having high quality, "positive instances," is found to be low because of the subjective determination of what constitutes a high quality question and answer pair. Hence, the labeled training set is generated by automatically downloading existing FAQs associated with a topic or theme from one or more data sources 110A, 110B or CQA sources 115A, 115B and identifying the existing FAQs as positive instances. Low quality question and answer pairs are manually collected from one or more separate CQA sources 115A, 115B.

In one embodiment, the low-quality question and answer pairs are obtained from a separate developing CQA source 115 or CQA sources 115A, 115B. Examples of low quality question and answer pairs, or "negative instances," include questions for chatting, questions seeking personal opinions or questions with ungrammatical English. In one embodiment, a set of positive instances and a set of negative instances are used as the training set for determining quality. For example, the training set comprises 2000 positive and 2000 negative instances. The set of features represented by the positive instances and the negative instances in the training set are then used to estimate the quality of different question and answer pairs in the CQA data. In one embodiment, the features from the training set are application-specific and are different features, or subsets of features, may be used in different applications. Using features from the training set, the selection module 330 produces a quality score for multiple question and answer pairs within a CQA cluster.

In addition to the quality score, the selection module 330 also generates a representative score by calculating the distance between an individual question and answer pair and the centroid of the K-means cluster, or other cluster, including the individual question and answer pair. In one embodiment, the quality score and the representative score are linearly combined to produce a suitability metric describing the suitability of a question and answer pair to be put into the final FAQ. For example, question and answer pairs having a suitability metric exceeding a specified threshold are stored and included in the final FAQ. Alternatively, question and answer pairs within a cluster of CQA data are ranked based on their associated suitability metrics and the question and answer pairs having the highest relative suitability metrics are stored included in the final FAQ. In other embodiments, the representative score and the quality score may be differently combined to generate the suitability metric.

FAQ Generation Using CQA Data

Figure 4:
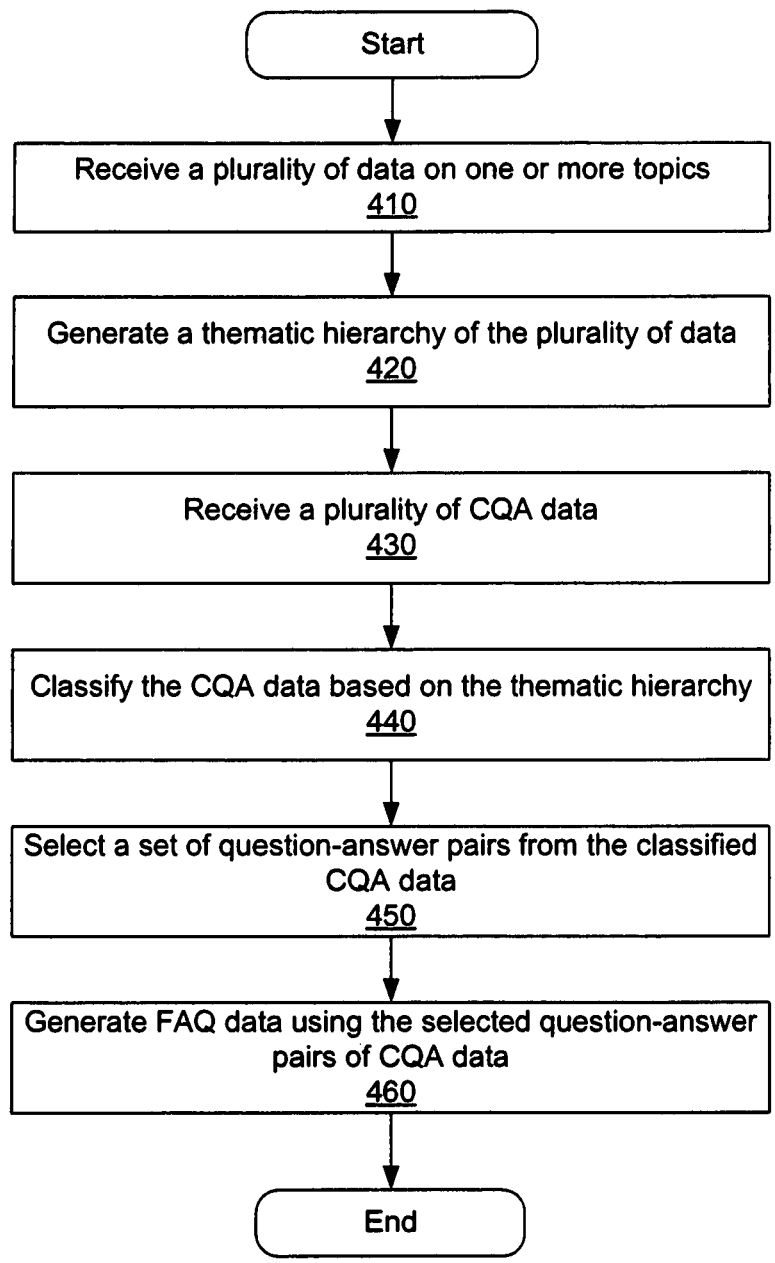
FIG. 4 is a flow chart of a process for generating FAQ data using CQA data in accordance with an embodiment of the invention.

FIG. 4 is a flow chart of a process for generating FAQ data using CQA data in accordance with an embodiment of the invention. Initially, the FAQ generator 130 receives 410 a plurality of data on or more topics (e.g., data sources 110A, 110B). The FAQ generator 130 generates 420 a thematic hierarchy of the plurality of data, where the thematic hierarchy identifies themes within a topic and the relationship of themes to each other. The FAQ generator 130 receives 430 a plurality of CQA data and classifies 440 the CQA data based on the thematic hierarchy. In one embodiment, the FAQ generator 130 uses a modified Class-Feature-Centroid (mCFC) classifier to classify received CQA data using the themes from the thematic hierarchy. The FAQ generator 130 selects 450 a set of question-answer pairs from the classified CQA data and generates 460 FAQ data using the selected question-answer pairs of CQA data.

Figure 5:
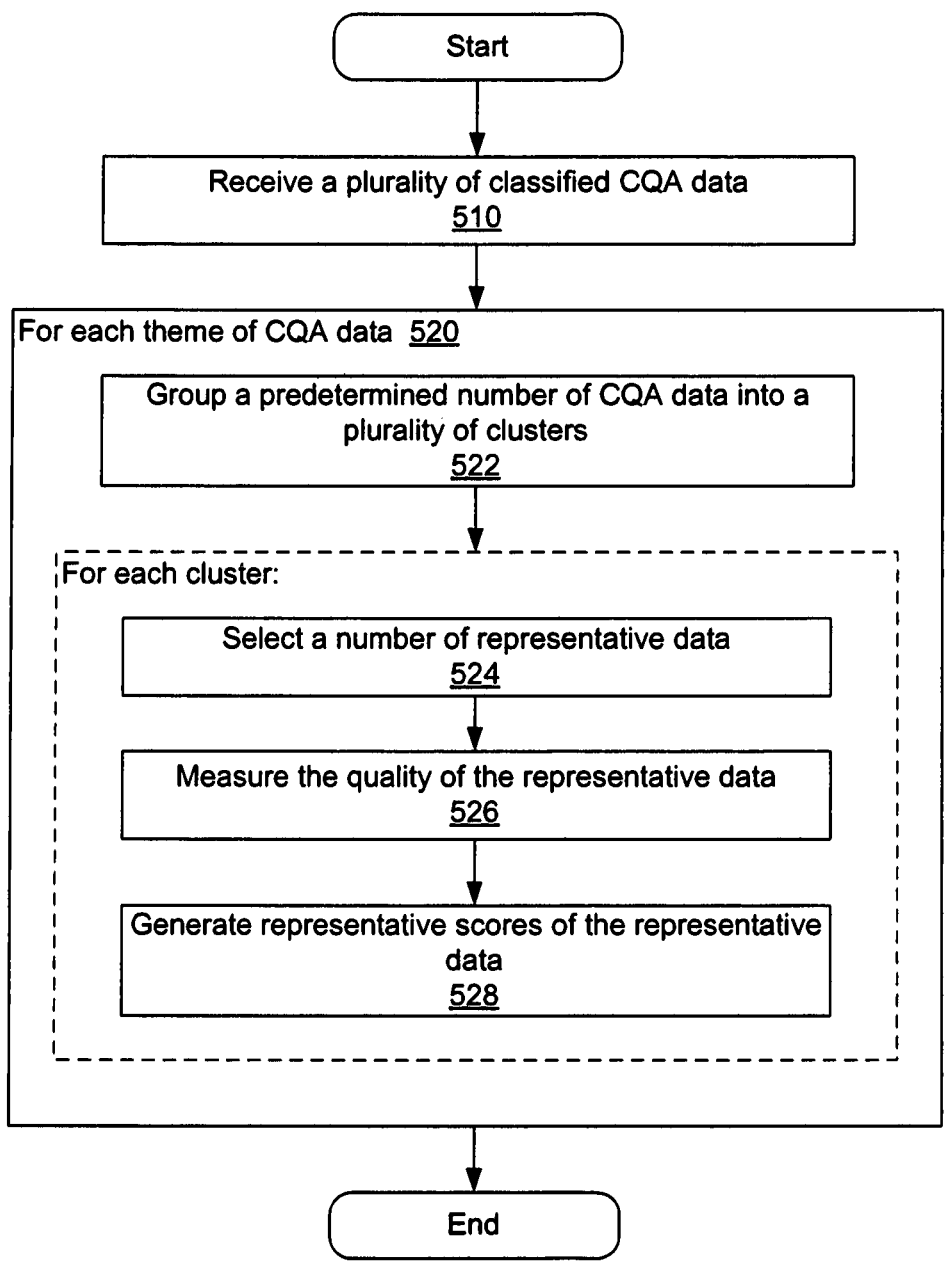
FIG. 5 is a flow chart of a process for selecting CQA data based on classification of CQA data for FAQ data generation in accordance with an embodiment of the invention.

FIG. 5 is a flow chart of a process for selecting CQA data based on classification of CQA data for FAQ data generation in accordance with an embodiment of the invention. The FAQ generator 130 receives a plurality of classified CQA data, where the CQA data are classified by the feature classifier 320 and the classified CQA data have one or more themes of the thematic hierarchy. For each theme of the classified CQA data, the FAQ generator 130 groups 522 a predetermined number of CQA data into multiple clusters (e.g., a K-means cluster), where the CQA data in a cluster share some common features related to the theme. The number of CQA data in a cluster is a configurable design choice.

For each cluster, the FAQ generator 132 selects 524 a number of representative data of the cluster, and measures 526 the quality of the representative data. For example, the FAQ generator 130 measures the quality of the representative data using a labeled training set, which provides ground-truth of question-answer pairs of a topic or theme. The quality of a representative data in a cluster can be represented by a quality score. The FAQ generator 130 further generates 528 a representative score for each question-answer pair of the representative data in the cluster, where the representative score of the representative data indicates how well the representative data represents the features associated with theme/topic of the cluster. For example, FAQ generator 130 generates the representative score by calculating the distance between an individual question-answer pair and the centroid of the K-mean cluster. The FAQ generator 130 selects one or more question-answer pairs from the clusters based on the quality and representativeness of the representative data.

Although shown in FIG. 1 as coupled to the FAQ generator 130 via a network 120, in other embodiments, one or more of the data sources 110A, 110B and/or one or more of the CQA sources 115A, 115B may be included in a single computing device or storage device. In an alternative embodiment, a single computing device includes the FAQ generator 130, one or more data sources 110A, 110B and/or one or more CQA sources 115A, 115B.

System Environment

Figure 2:
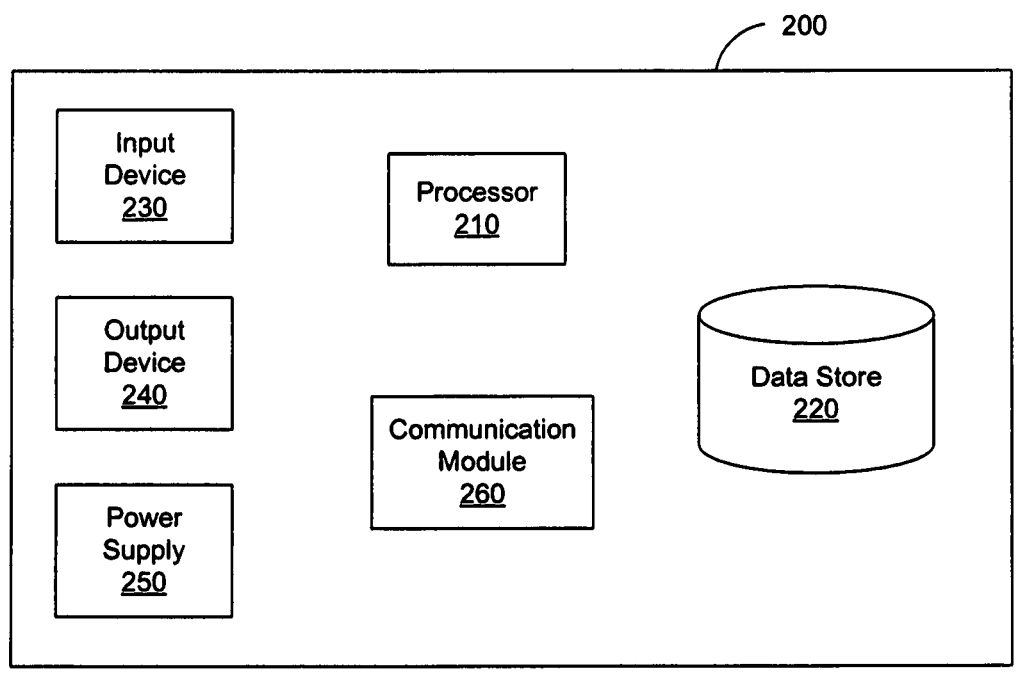
FIG. 2 is a block diagram of a computing device in accordance with an embodiment of the invention.

FIG. 2 illustrates an embodiment of a computing device 200 used to implement the FAQ generator 130. In the embodiment shown in FIG. 2, the computing device 200 comprises a processor 210, a data store 220, an input device 230, an output device 240, a power supply 250 and a communication module 260. It should be understood, however, that not all of the above components are required for the computing device 200, and this is not an exhaustive list of components for all embodiments of the computing device 200 or of all possible variations of the above components. A computing device 200 may have any combination of fewer than all of the capabilities and components described herein.

The processor 210, data store 220, and the power supply 250, such as a battery or any other suitable power source enable the computing device 200 to perform computing functionalities. The processor 210 is coupled to the input device 230 and the output device 240 enabling applications running on the computing device 200 to use these devices. In one embodiment, the data store 220 comprises a small amount of random access memory (RAM) and a larger amount of flash or other persistent memory, allowing applications or other computer executable code to be stored and executed by the processor 210. In one embodiment, the data store 220 includes instructions, that when executed cause the processor to perform the actions described above in FIG. 1 in conjunction with the FAQ generator 130, allowing the computing device 200 to retrieve data from one or more data sources 110A, 110B and from one or more CQA sources 115A, 115B to automatically generate a FAQ. The computing device 200 also executes an operating system or other software supporting one or more input modalities, for receiving input from the input device 230 and/or one or more output modalities presenting data via the output device 240, such as audio playback or display of visual data.

The output device 240 may comprise any suitable display system for providing visual feedback, such as an organic light emitting diode (OLED) display. The output device 240 may also include a speaker or other audio playback device to provide auditory feedback. For example, the output device 240 may communicate audio feedback (e.g., prompts, commands, and system status) according to an application running on the computing device 200 using the speaker and also display word phrases, static or dynamic images, or prompts as directed by the application using the display. The input device 240 comprises any suitable device for receiving input from a user, such as a keyboard, touch-sensitive display or gesture capture system.

The communication module 260 comprises a wireless communication circuit allowing wireless communication with the network 120 (e.g., via Bluetooth, WiFi, RF, infrared, or ultrasonic). For example, the communication module 260 identifies and communicates with one or more wireless access points using WiFi or identifies and communicates with one or more cell towers using RF. In an embodiment, the communication module 260 also includes a jack for receiving a data cable (e.g., Mini-USB or Micro-USB).

SUMMARY

The description of the embodiments of the invention is presented in this application for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method of generating Frequently Asked Questions (FAQ) data from Community-based Question Answering (CQA) data, the method comprising:
   receiving a plurality of data sources and a topic having one or more themes, wherein each data source has data associated with one or more topics;
   generating a thematic hierarchy of the plurality of data sources;
   classifying a plurality of CQA data into one or more themes based on the thematic hierarchy, where the CQA data containing a plurality of question-answer pairs;
   selecting a plurality of question-answer pairs from the CQA data based on the classification, the selecting comprising:
      for each theme of the CQA data, grouping a plurality of CQA data into a plurality of clusters, wherein the CQA data in a cluster share one or more features associated with the theme, and a cluster of CQA data has a centroid representing the theme of the cluster; and
   generating FAQ data using the selected question-answer pairs of the CQA data.

2. The method of claim 1, wherein the topics and themes of the plurality of data sources are organized hierarchically within the thematic hierarchy.

3. The method of claim 1, wherein classifying the plurality of CQA data comprises using a centroid-based classifier, wherein a theme of the CQA data has a centroid of a plurality of prototypes associated with the theme.

4. The method of claim 3, wherein the centroid of the plurality of prototypes associated with the theme is based on the weights assigned to the plurality of prototypes associated with the theme.

5. The method of claim 1, wherein selecting the plurality of question-answer pairs from the CQA data further comprises, for each cluster of CQA data:
- selecting a plurality of representative data from the cluster;
- measuring a quality of the representative data; and
- generating a representative score for each question-answer pairs of the representative data.

6. The method of claim 5, wherein measuring the quality of the representative data comprises generating a quality score of the representative data.

7. The method of claim 5, wherein generating a representative score of the representative data comprises calculating the distance between a question-answer pair of the CQA data with the centroid of the cluster.

8. The method of claim 5, wherein generating a representative score for each question-answer pair of the representative data further comprises ranking the question-answer pairs of the CQA data in the cluster based on the representative scores.

9. A non-transitory computer-readable medium storing executable computer program code for generating Frequently Asked Questions (FAQ) data from Community-based Question Answering (CQA) data, the computer program code comprising code for:
- receiving a plurality of data sources, a data source having data associated with one or more topics, and a topic having one or more themes;
- generating a thematic hierarchy of the plurality of data sources;
- classifying a plurality of CQA data into one or more themes based on the thematic hierarchy, where the CQA data containing a plurality of question-answer pairs;
- selecting a plurality of question-answer pairs from the CQA data based on the classification, the selecting comprising:
  - for each theme of the CQA data, grouping a plurality of CQA data into a plurality of clusters, wherein the CQA data in a cluster share one or more features associated with the theme, and a cluster of CQA data has a centroid representing the theme of the cluster; and
- generating FAQ data using the selected question-answer pairs of the CQA data.

10. The computer-readable medium of claim 9, wherein the topics and themes of the plurality of data sources are organized hierarchically within the thematic hierarchy.

11. The computer-readable medium of claim 9, wherein the computer program code for classifying the plurality of CQA data comprises computer program code for using a centroid-based classifier, wherein a theme of the CQA data has a centroid of a plurality of prototypes associated with the theme.

12. The computer-readable medium of claim 9, wherein the computer program code for selecting the plurality of question-answer pairs from the CQA data further comprises computer program code for, for each cluster of CQA data:
- selecting a plurality of representative data from the cluster;
- measuring quality of the representative data; and
- generating a representative score for each question-answer pairs of the representative data.

13. The computer-readable medium of claim 12, wherein the computer program code for measuring the quality of the representative data comprises computer program code for generating a quality score of the representative data.

14. The computer-readable medium of claim 12, wherein the computer program code for generating a representative score of the representative data comprises computer program code for calculating the distance between a question-answer pair of the CQA data with the centroid of the cluster.

15. The computer-readable medium of claim 12, wherein the computer program code for generating a representative score for each question-answer pair of the representative data further comprises computer program code for ranking the question-answer pairs of the CQA data in the cluster based on the representative scores.

16. A system of generating Frequently Asked Questions (FAQ) data from Community-based Question Answering (CQA) data, the system comprising:
- a non-transitory computer-readable storage medium storing executable computer program modules comprising a thematic hierarchy generation module configured to:
  - receive a plurality of data sources, a data source having data associated with one or more topics, and a topic having one or more themes, and
  - generate a thematic hierarchy of the plurality of data sources;
- a feature classifier configured to classify a plurality of CQA data into one or more themes based on the thematic hierarchy, where the CQA data containing a plurality of question-answer pairs; and
- a selection configured to:
  - select a plurality of question-answer pairs from the CQA data based on the classification, the selecting comprising:
    - for each theme of the CQA data, grouping a plurality of CQA data into a plurality of clusters, wherein the CQA data in a cluster share one or more features associated with the theme, and a cluster of CQA data has a centroid representing the theme of the cluster, and
  - generate FAQ data using the selected question-answer pairs of the CQA data.

17. The system of claim 16, wherein the selection module is further configured to, for each cluster of CQA data:
- select a plurality of representative data from the cluster;
- measure quality of the representative data; and
- generate a representative score for each question-answer pairs of the representative data.

* * * * *